United States Patent
Allen et al.

(10) Patent No.: US 6,342,945 B1
(45) Date of Patent: Jan. 29, 2002

(54) SYSTEM AND METHOD FOR MEASURING POLARIZATION MODE DISPERSION SUITABLE FOR A PRODUCTION ENVIRONMENT

(75) Inventors: David W. Allen, Wilmington, NC (US); Alan F. Evans, Beaver Dams; Jerome G. Racki, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/512,724

(22) Filed: Feb. 24, 2000

Related U.S. Application Data

(60) Provisional application No. 60/127,107, filed on Mar. 31, 1999.

(51) Int. Cl.[7] ............................................. G01N 21/00
(52) U.S. Cl. ................................................... 356/73.1
(58) Field of Search ........................ 356/73.1, 364–367; 250/225, 227.17

(56) References Cited

U.S. PATENT DOCUMENTS

| | | | |
|---|---|---|---|
| 4,556,314 A | * 12/1985 | Stone | 356/73.1 |
| 5,298,972 A | 3/1994 | Heffner | 356/364 |
| 5,317,666 A | 5/1994 | Agostinelli et al. | 385/122 |
| 5,365,337 A | 11/1994 | Page et al. | 356/350 |
| 5,675,428 A | 10/1997 | Henmi | 359/161 |
| 5,965,874 A | 10/1999 | Aso et al. | 250/225 |

FOREIGN PATENT DOCUMENTS

| | | |
|---|---|---|
| EP | 0 553 460 | 8/1993 |
| EP | 0 982 882 | 3/2000 |
| WO | WO 98/36256 | 8/1998 |

OTHER PUBLICATIONS

Patent Abstracts of Japan, vol. 18, No. 250 (p. 1736), May 12, 1994, JP 0603446.
Patent Abstracts of Japan, JP 05 248,996, Sep. 28, 1993.
Patent Abstracts of Japan, JP 59 159,043, Mar. 1, 1983.
J. Ellison et al., "Spun fibre parameter extraction using Polarimetric Optical Time Domain Reflectometry", 1998 National Institute of Standards and Technology.
B.L. Heffner, "Attosecond–resolution measurement of polarization mode dispersion in short sections of optical fiber", Optics Letters, vol. 18, No. 24, Dec. 15, 1993, pp. 2102–2104.

(List continued on next page.)

*Primary Examiner*—Frank G. Font
*Assistant Examiner*—Tu T. Nguyen
(74) *Attorney, Agent, or Firm*—William J. Chervenak

(57) ABSTRACT

A system for measuring polarization mode dispersion (PMD) in a fiber using a polarizer controlling the polarization state of light input to the fiber and a polarization analyzer measuring the polarization state of light output from the fiber. Jones matrix analysis is applied to data derived from three input polarization states and two wavelengths of probing radiation. Performance is improved by using incoherent light sources such as light emitting diodes in conjunction with two bandpass filter. However, a laser source and optical detector are used to align the fiber. The system is particularly useful in measuring PMD values in short lengths of fiber and mapping those values with a long fiber from which the test fiber was cut. Preferably, the PMD is measured for various values of twist experimentally induced in the test fiber, and the short-length PMD value is that associated with zero-internal twist in the fiber as calculated according to a model. The fiber may also be loaded during measurement.

10 Claims, 2 Drawing Sheets

OTHER PUBLICATIONS

B.L. Heffner, "Automated Measurement of Polarization Mode Dispersion Using Jones Matrix Eigenanalysis", IEEE Photonics Technology Letters, vol. 4, No. 9, Sep., 1992, pp. 1066–1069.

R. Schuh et al., "Polarization Mode Dispersion in Spun Fibers with Different Linear Birefringence and Spinning Parameters", Journal of Lightwave Technology, vol. 16, No. 9, Sep. 1998, pp. 1583–1588.

A. Evans, et al., "Attosecond Measurement Resolution of Short–Length Polarization Mode Dispersion in Optical Fiber and Effects of Twist", Optical Fiber Measurement Conference, Sep., 1995, Liege, Belgium.

* cited by examiner

SYSTEM AND METHOD FOR MEASURING POLARIZATION MODE DISPERSION SUITABLE FOR A PRODUCTION ENVIRONMENT

This application claims the benefit of U.S. Provisional Patent Application No. 60/127,107, filed Mar. 31, 1999.

BACKGROUND OF THE INVENTION

1. Field of the Invention

The present invention relates generally to optical measuring equipment and methods, and in particular to such equipment and methods for measuring birefringence in such measures as differential group delay.

2. Technical Background

Optical fiber is the favored transmission medium for long-distance telecommunication systems because of its very large bandwidth (that is, data carrying capacity), immunity to noise, and relatively low cost. Attenuation in silica optical fiber has been reduced to such low levels that it is possible to transmit data over hundreds of kilometers without the need for amplifiers or repeaters. The data carrying capacity of a fiber communication system over relatively short distances is in large part dictated by the speed of the electronics and opto-electronics used at the transmitter and receiver. At the present time, the most advanced commercially available optical receivers and transmitters are limited to about 10 gigabits/sec (Gb/s), although 40 Gb/s systems are being contemplated.

However, over the longer distances typical for telecommunications, dispersion of various types may limit the useful bandwidth. A cylindrical optical fiber of fairly large cross section can transmit a number of waveguide modes exhibiting different spatial power distributions. The propagation velocity differs between the fundamental mode and the higher-order modes in an effect called modal dispersion. An optical signal impressed by a transmitter on the fiber will typically contain a distribution of all the modes supportable by the fiber. Because of the modal dispersion, the different modes after traversing a long section of fiber will arrive at the receiver at slightly different times. The transmission rate is limited by the dispersion integrated along the transmission length.

In order to avoid modal dispersion, most modem fiber communication systems intended for long-distance transmission rely upon single-mode fiber. In the case of a simple fiber with a core and cladding, the core of a single-mode fiber is so small, taken in conjunction with the difference of refractive indices between the core and the cladding, that the fiber will support only the fundamental mode. All higher-order modes are quickly attenuated over the distances associated with long-distance telecommunication. The description is more complicated for a profiled fiber or for a fiber having multiple cladding layers, but it is well known how to fabricate and test a fiber such that it is single-moded.

A circularly symmetric single-mode fiber in fact supports two fundamental transverse modes corresponding to the two polarization states of the lowest-order modes. To a fair approximation, these two lowest-order modes are degenerate in the circular geometry of a fiber and have the same velocity of propagation so there is no polarization dependent dispersion. However, as will be explained later, polarization dependent dispersion can arise in a realistic fiber.

In the past, high bit-rate transmission over long distances of single-mode fiber has been limited by chromatic dispersion, also characterized as group velocity dispersion. A data signal impressed on an optical carrier signal causes the optical signal to have a finite bandwidth, whether it be considered produced by the spectral decomposition of a pulsed signal or by the data bandwidth of an analog signal. Generally, the velocity of propagation or propagation constant of an optical signal, is primarily dependent upon the refractive index of the core, varies with optical frequency. As a result, the different frequency components of the optical signal will arrive at the receiver at different times. Chromatic dispersion can be minimized by operating at wavelengths near zero dispersion, about 1300 nm for silica, or by other methods for compensating dispersion.

Despite its circularly symmetric design, real optical fiber is typically birefringent. This means that the two lowest-order axial modes are not degenerate, and the fiber at any point may be characterized as having a fast axis and a slow axis. The two modes traveling along the fiber with their electric field vectors aligned respectively with the fast and slow axes of the fiber will propagate relatively faster or slower. As a result, the group velocity of a signal traversing the fiber is a function of the polarization state of the optical signal. Birefringence can arise from internal or external sources. The fiber may have been drawn with a slight physical non-circularity. The fiber may be installed such that a bend, lateral load, anisotropic stress, or a twist is applied to it. The birefringent interaction is complicated by coupling of the two modes also occurring at fiber twists, bends, or other causes. The coupling causes energy to transfer between the orthogonal modes. But even with mode coupling, the group delay continues to spread out, resulting in a significant polarization mode delay or dispersion (PMD). The cause of mode coupling is not completely understood, but it is modeled by a statistical model of randomly occurring mode-coupling sites with an average distance between the sites (mode coupling length), which typically assumes a value between about 5m and 100 m. The exact mode coupling length depends on the deployment of the fiber and is not usually characteristic of the intrinsic fiber birefringence.

It is estimated that above about 10 Gb/s, polarization mode dispersion limits fiber bit rates more than other types of dispersion. Polarization mode dispersion also degrades cable television (CATV) systems by introducing composite second-order distortion and signal fading.

Some fiber manufacturers draw their fiber with a small continuous twist applied to the fiber so that manufacturing anisotropies do not allow the fast and slow modes to always be aligned to a propagation mode. Thereby, the difference in propagation delay between the two modes is lessened, resulting in reduced PMD. A further technique for reducing net PMD over a long distance is to periodically reverse the direction of the manufacturing twist.

In the past, polarization mode dispersion has been treated as a time-dependent quantity requiring a statistical description. PMD has been typically measured on long lengths (1 km or more) of fiber wound under low tension about a spool of large diameter. The bending and stress induced by higher tension winding on a smaller shipping spool affect the birefringence and mode coupling and, hence, the average PMD experienced. However, setting up such a test demands time and resources. Further, the 1 km sections of fiber cut from the shipping spool or the production line cannot be otherwise used, and the testing represents a loss 1 km of fiber, which for a standard 25 km spool is a loss of 4%.

Accordingly, it is desired to measure the effects of polarization mode dispersion expected to be experienced in a realistic environment with out the need to test long lengths of fiber. It is further desired to measure the effects of polarization mode dispersion in an accurate and deterministic fashion.

SUMMARY OF THE INVENTION

The invention includes a method and apparatus for measuring polarization mode dispersion in an optical fiber, preferably quantified as differential group delay between the two fundamental polarization modes.

In one aspect of the invention, one or more incoherent light sources are used in conjunction with optical bandpass filters to provide light to a polarimeter arranged to measure birefringence in an optical fiber. The polarimeter measures how the fiber affects the state of polarization of light passing through it, preferably by a measurement of polarization mode delay or dispersion.

Visible laser light may be switched into the fiber for visual alignment. Laser light of wavelength comparable to that of the incoherent sources may also be switched into the fiber and electronically detected to complete the alignment. An optical switch can be positioned at the output of the fiber under test to switch the light alternatively to the polarimeter and the alignment detector without affecting the measurement of polarization mode dispersion.

The fiber may be subjected to a selected amount of twist along its length. The measured twist-dependent polarization mode dispersion may be used to determine several optical properties of the fiber. The fiber may also be subjected to a selected amount of load or otherwise stressed during its testing.

The value of polarization mode dispersion measured for a short length of fiber may be empirically mapped to values for longer fiber, with the polarization mode coupling length being intermediate the two fiber lengths. The mapping may be used to measure the mode coupling length.

DETAILED DESCRIPTION OF THE PREFERRED EMBODIMENTS

Figure 1:
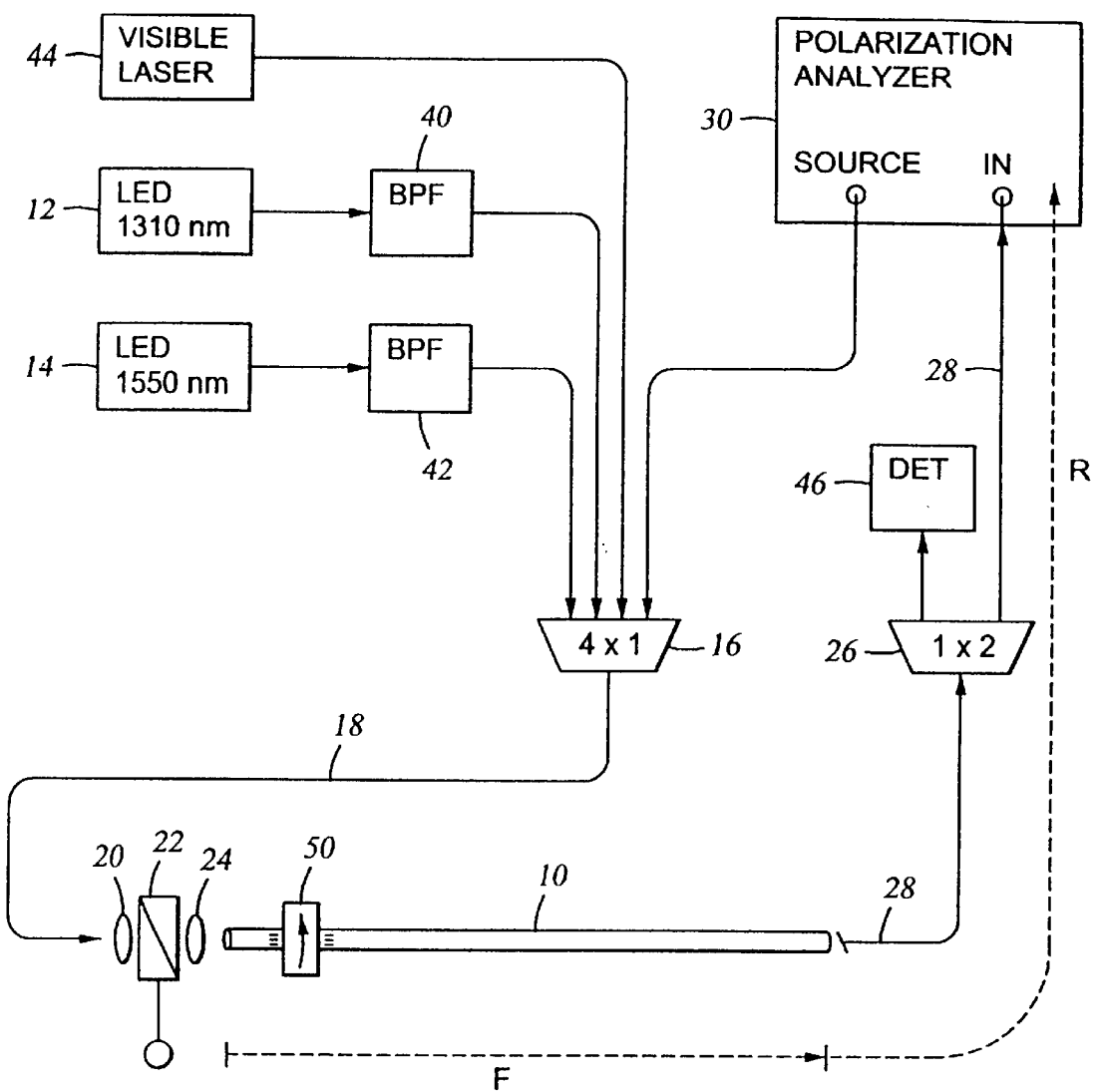
FIG. 1 is a schematic illustration of system for measuring polarization mode dispersion in a short length of optical fiber.

The invention enables the measurement of polarization mode dispersion performed by an improved measurement system on a short length of fiber. The fiber length is maintained generally to about 1 m, which is usually less than the length over which modes are randomly mixed by environmental influences, that is, the mode coupling length. The short-length value can be mapped to much longer lengths of fiber so as to predict their behavior in the field.

In the basic Jones matrix measurement technique, the differential group delay $\Delta\tau_n$ between two orthogonal polarization modes is measured over a range of frequencies between $\omega_1$ and $\omega_n$. Under the normal circumstances described here, only the two end frequencies $\omega_{n-1}$ and $\omega_n$ bracketing a wide region of interest need to be measured, for example, wavelengths of 1300 nm and 1550 nm. The differential group delay $\omega\tau_n$ is derived from Jones matrices T measured for each of the two frequencies. A Jones matrix T is a 2×2 matrix with possibly complex elements relating the polarization states of two orthogonal input signals, expressed as two-component vectors, to the corresponding polarization states of the output signals after traversing some optical component being measured. An example of the optical measurement circuit used to measure the Jones matrices is illustrated in the schematic diagram of FIG. 1. A fiber under test (FUT) 10 having a length of about 1 m is laid out on a table in a straight line. Two narrow-band light sources 12, 14 are selectively switched by a 4×1 optical switch 16 to a single-mode input fiber 18. A first lens 20 collimates the light from the input fiber through a controllable polarizer 22. A second lens 24 directs the polarized light from the input fiber 18 to the input end of the FUT 10. One of the lenses 20, 24 may be eliminated with one lens focused on both fibers 10, 18. The light output by the FUT 10 is switched through a 1×2 optical switch 26 to a single-mode output fiber 28 inputting to a polarization analyzer or polarimeter 30 such as an HP8509B available from Hewlett-Packard of Palo Alto, Calif. The fiber on both sides of the 1×2 switch 26 will be referred to as the output fiber 28.

A polarimeter measures the polarization state of a detected signal, which may be characterized as a point on the Poincare sphere. The equator of the Poincare sphere represents linear polarizations, the poles represent the two circular polarization, and the surface between represents elliptical polarizations. For each optical frequency, the polarizer 22 is set to three different angular positions or three differently aligned polarizers 22 are inserted in the beam path to produce a known sequential set of linearly polarized state entering the FUT 10. The polarization analyzer 30 measures the resultant complex output polarization state vector, which may be represented as h, v, and q. A commonly used set of angles are 0°, 6°, and 120° although 0°, 45°, and 90° could be easily substituted.

From these six states of polarization, the Jones matrix can be calculated to within a multiplicative constant by a method such as the one now described. A set of complex ratios from the three measured states are calculated from the x and y values of the measured state vectors: $k_1=h_x/h_y$; $k_2=v_x/v_y$, $k_3=q_x/q_y$; and $k_4=(k_3-k_2)(k_1-k_3)$. To within a complex scalar multiplier $\beta$, the transmission Jones matrix T is given by $$T = \beta \begin{bmatrix} k k_4 & \ldots & k_2 \\ k_4 & \ldots & 1 \end{bmatrix}$$

Since this is an eigenvalue analysis, scalar constants such as $\beta$ are not important. A linear input polarizer 22 is preferred, but some type of polarizer is needed to set the input polarization state while the polarimeter 30 measures the output polarization state.

The illustrated polarization analyzer 30 includes an optical output selectable between two Fabry-Perot lasers emitting at near 1310 and 1550 nm. This laser source can be switched to the FUT 10 through the 4×1 switch 16. However, as described below, other light sources are desired for the principal measurement. Both optical switches 16, 26 can be implemented with commercial available switches, for example, ones based on mechanically movable optical fibers selectively coupling one port to any of several other ports.

The Jones matrices measured at the two frequencies are used to compute a matrix product $T(\omega_n)T^{-1}(\omega_{n-1})$, itself a 2×2 matrix, where $T^{-1}$ denotes the matrix inverse, $TT^{-1}=1$, where 1 is the diagonalized unit matrix. The differential group delay is then calculated as $$\Delta \tau_n = \left| \frac{\text{Arg}(\rho_1/\rho_2)}{\omega_n - \omega_{n-1}} \right|$$

where $\rho$ and $\rho_2$ are the complex eigenvalues of the matrix product $T(\omega_n)T^{-1}(\omega_{n-1})$ and Arg denotes the argument function $$\text{Arg}(A\ e^{i\theta}) = \theta$$

The eigenvalues are the two diagonal elements of a diagonalized version of the matrix product $T(\omega_n)T^{-1}(\omega_{n-1})$, where the diagonalization is performed with eigenanalysis techniques well known in quantum mechanics and optics.

The DGD (differential group delay) $\Delta\tau_n$ is one measure of the fiber's birefringence or polarization mode dispersion for wavelengths within the wavelength range of the measurement and as normalized for the measured length of fiber.

In practice, to eliminate the effect of the output fiber 28 and associated components in the output optical path, the path between the polarizer 22 and the polarization analyzer 30 is divided in two parts, the path through the FUT 10 having a fiber Jones matrix F and the output path having a residual Jones matrix R. One measurement is made of the Jones matrix M for the entire path including both the FUT 10 and the output fiber 28. The FUT 10 is then removed, and the polarizer 22 and associated optics 20, 24 are brought to the point corresponding to the output end of the FUT 10. The residual Jones matrix R is measured for the output fiber 28 and other parts within the output path. The eigenvalues $\rho_1$, $\rho_2$ are then calculated for the FUT 10 alone based on the matrix product $$F_1 F^{-1}{}_2 = R^{-1}{}_1 M_1 M^{-1}{}_2 R_2$$

This technique is ascribed to be able to measure differential group delays of less than 12 femtosecond ($12 \times 10^{-15}$ s) with a resolution of at least 50 attoseconds ($50 \times 10^{-18}$ s).

The measurement circuit of FIG. 1 is improved in several ways. Instead of the conventional lasers included in the polarization analyzer 30, light emitting diodes (LEDs) are used as the light sources 12, 14. Commercial LEDs are available which emit at two wavelengths, for example, 1310 nm and 1550 nm. The outputs of the LEDs 12, 14, which have relatively wide spectra since they are not lasing, are filtered by respective optical bandpass filters 40, 42, for example, dielectric thin film interference filters with 3 db spectral bandwidths of about 10 nm centered near the optical output peaks of their respective LEDs 12, 14. Other non-coherent light sources may be used. A single light source could be used for the two wavelengths if it emits sufficient light at the two wavelengths. The combination of LEDs 12, 14 and bandpass filters 40, 42 reduces the problem of coherence noise. Coherence noise arises at the butt-coupled joint between the FUT 10 and the output fiber 28 at which the two fibers have two facets separated by a small gap to reduce reflection. A laser has a coherence length of about 30 cm. As a result, multiple reflections of a coherent signal in the gap may constructively or destructively interfere, creating noise.

For light from an incoherent source producing light with a coherence length of less than about 200 $\mu$m (twice the smallest air gap in the system), the light cannot significantly interfere on multiple reflections. It is preferred to use the LEDs 12, 14 in place of the source light from the polarization analyzer 30. LEDs do not lase and so have a very short coherence length. They do have a relatively wide emission wavelength, but the bandpass filters 40, 42 reduce the bandwidth to an acceptable value to permit accurate polarization measurements, but the bandpass of the filters 40, 42 must not be so narrow as to lead to coherence noise.

Another means of reducing coherence noise is to cleave the output end of the FUT 10 at an angle differing from the facet angle of the input of the output fiber 28 by at least about 11. It is unlikely that light will resonate in such a varying gap. Preferably, the FUT 10 is perpendicularly cleaved, and the input end of the output fiber 28 is cleaved at about 11, as indicated by the slanted line in FIG. 1.

The alignment of different fibers and the alignment required with measuring the Jones matrix R for the output path is performed by unillustrated translation stages at the output end of the fiber, at either end of the FUT 10, and at the input end of the output fiber 28. The output fiber 28 should be rigidly held so that it does not introduce variable polarization mode dispersion between measurements. The rough alignments, usually done after bench maintenance, are facilitated by switching the output of a visible laser through the 4×1 optical switch 16 to the FUT 10 or, during the residual measurement, to the output fiber 28. The visible light propagates with relatively high loss in the infrared single-mode fibers 10, 18, 28 and causes the fibers to glow, and either the glowing or the output light can be visually observed for initial alignment. The optical intensities of the light output from the LEDs 12, 14 are relatively low compared to the laser light from the laser sources in the polarization analyzer 30. For fine alignment, the 4×1 switch 16 and the 1×2 switch 26 switch light from the laser source of the polarization analyzer, which is of single-mode wavelength in the fibers, to an optical power detector 46, and the stages are adjusted to maximize the signal of the detector 46. It has been observed that the contribution of the 1×2 optical switch 26 to polarization mode dispersion remains relatively stable so that once it is accounted for in the residual matrix R it does not interfere with measuring the Jones matrices F of the FUT 10. It is, of course, possible to incorporate the detector 46 in the polarization analyzer 30, which already includes at least one detector.

The laser sources in the polarization analyzer 30 can also be used to detect phase aliasing. This effect arises from the fact that the measured values are in essence phase angles mapped onto the Poincare sphere, and these phase angles are ambiguous to within factors of 180°. To detect possible aliasing, either the analyzer laser source or another laser having a wavelength somewhat different than that of the two LEDs 12, 14 is used to measure yet another Jones matrix. If the three DGD values associated with wavelength are nearly constant, then the measurement is probably valid. If the values for the middle wavelength are different, there is a good possibility that the measured polarization mode dispersion is artificially low because of aliasing.

An alternative apparatus to that of FIG. 1 includes, instead of the HP polarization analyzer, a polarimeter utilizing a rotating half-wave plate, such as Model PA430 commercially available from Thor Laboratories of Newton, N.J. The input end of the fiber 28 and the polarimeter are placed on a transversely movable stage. The fiber 28 is directly connected to the optical power meter 46 with no intervening switch 26. With the stage positioning the fiber 28 at the output of the FUT 10, the stages at the two ends of the FUT 10 are adjusted to align the FUT 10 with the assistance of the power meter 46. The transverse stage then moves the polarimeter to closely face the output of the FUT 10 with free space in between. The DGD measurement is then performed as described before. The apparatus offers more stability and eliminates the need to account for the residual matrix R. Yet other types of polarimeters are available, for example, ones using optical time domain reflectometry.

The effect of fiber twist can be investigated by attaching one end of the FUT 10 to a twist unit 50 which can rotate about the longitudinal axis of the FUT 10. The other end of the FUT 10 is immobilized to twist by an unillustrated clamp. Since the length of the FUT 10 is short and chosen to be less than the mode-mixing length, the effect of induced twist on polarization mode dispersion is deterministic and can be predicted through the photoelastic effect with minimal effect from mode mixing.

The twist unit 50 must be designed to minimize anisotropic forces on the fiber since they would contribute their own birefringence. A prototype design includes two cylindrical clips which grip the fiber. A jig holds the clips spaced about 2 cm apart firmly enough to circumferentially hold the fiber as it is rotated but gently enough to not induce additional birefringence in the fiber. One such jig attached to one end of the fiber is fixed while another such jig attached to the other end of the fiber is mounted on a rotatable stage that can rotate, for example, five turns in each direction.

The twist unit 50 can be used for a number of different purposes. It can measure the effect of twist stored in a fiber and incurred during spooling. Previous attempts to do this have used 100 m lengths of fiber. It can be used as an alignment tool if the installation of the FUT 10 inadvertently induces a twist, as often happens in a production environment. As will become evident in our discussion, it can be used to separate twist-induced birefringence from the intrinsic birefringence of the fiber, sometimes reported as beat length.

Figure 2:
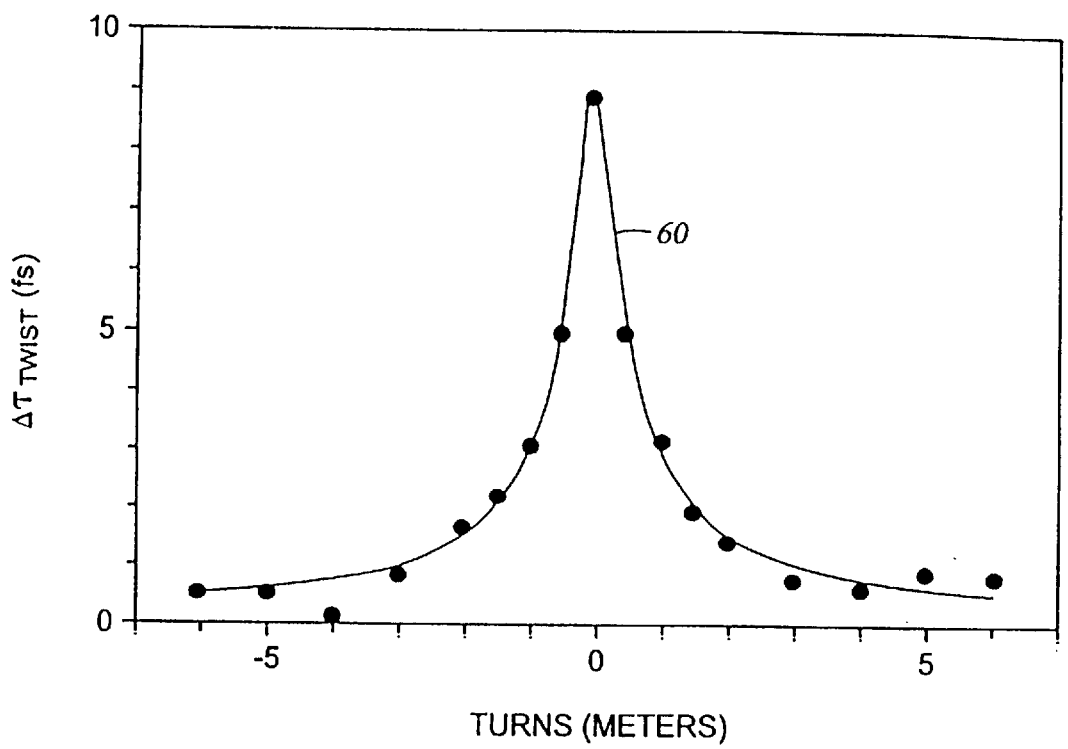
FIG. 2 is a graph of the twist dependence of the differential group delay of a fiber.

It is believed that a PMD value associated with zero twist and measured on a short fiber is the best predictor of PMD for a long fiber. The net zero-twist value in a low twist region can be derived in the face of both manufacturing and experimentally induced twist by using a model for the polarization mode dispersion $\Delta\tau_{twist}$ induced or present in a short length of unspun fiber (fiber without significant twist in the drawing process) as a function of twist angle $\theta$ $$\Delta\tau_{twist} = \frac{\Delta\tau_0}{\sqrt{1+4\left(\frac{\theta-\theta_0}{\Delta\beta}\right)^2}}$$

where $\Delta\tau_0$ is the net zero-twist DGD value, $\theta_0$ is a twist offset angle, and $\Delta\beta$ is the inherent birefringence of the fiber, which is inversely proportional to the beat length $L_B$. An example of the measured polarization mode dispersion as a function of applied twist is shown in the graph of FIG. 2, where one turn is 360° of twist. The experimental data are marked by the solid circles. The data have been fit to curve 60 with the above equation according to the two parameters $\Delta\tau_0$ (the peak of the curve 60) and the inherent birefringence $\Delta\beta$, which corresponds to a beat length of L=9.75 m. However, the effective induced twist is assumed to be equal to 0.92 that of the actual mechanical twist where the difference is due to a photoelastic effect in the opposite direction. The interpolation provided by the curve fitting to the above equation provides a more accurate value of the net zero-twist polarization mode dispersion $\Delta\tau_0$.

In this curve, the twist offset $\theta_0$ induced experimentally or otherwise present has already been aligned out. The internal twist may be induced by the operator, and values of 0.75 turns/m are not unusual. The fiber winding operation may twist the fiber, and the twist is not reversed by the operator. Values of 0.3 turns/m are typical. The fiber manufacturing may inadvertently introduce a net unidirectional spin. It is not untypical for a fiber that is manufactured with a spin oscillation (clockwise then counterclockwise) with an amplitude of about 3 turns/m to have a net unidirectional spin of 0.1 turns/m. Spin differs from twist in that there is no restoring photoelastic force for spin induced during the drawing process.

To account for the induced twist in determining an intrinsic birefringence of the fiber, the following procedure may be followed. After the intensity alignment mentioned previously has been performed, the polarization mode dispersion should be measured for a number of values of twist. Between each measurement, the input side of the FUT 10 is realigned to compensate for any rotation offset. The twist angle $\theta$ exhibiting the maximum value of polarization mode dispersion, as measured with the polarization analyzer, is taken as the net zero-twist position $\theta_0$. It is not unusual that 90° of twist needs to be compensated, and at least part of this is believed to be induced during fiber mounting. Using the initial measured value for polarization mode dispersion would normally result in too low a value according to the dependence shown in FIG. 2.

It is of course appreciated that the repetitive measurements required for polarization mode testing and the twisting experiments can be easily automated. Furthermore, the twist equation can be generalized to the unknown angular offset $\theta_0$ so as to combine twist alignment and generation of the twist data. It is also appreciated that the residual polarization mode dispersion, that is, the residual Jones matrix R, needs to be tested only infrequently since it is assumed to be independent of the fiber used as the FUT 10.

The twist dependence predicted by the above equation and experimentally observed as in FIG. 2 assumes that the photo-elastic effect is relatively small so that the twisting does not induce significant stress in the fiber. Expressed alternatively, the inherent birefringence is assumed to be large compared to the photo-elastic effect. A more complete version of the equation incorporating stress effects is given by $$\Delta\tau_{twist} = \frac{\omega\Delta\tau_0^2 + (g-2)(\theta-\theta_0)^2 g'}{\sqrt{\omega^2\Delta\tau_0^2 + (g-2)^2(\theta-\theta_0)^2}}$$

where g is the photoelastic constant and g' is its derivative with respect to frequency, $\partial g/\partial\omega$. Any negative values of $\Delta\tau$ should be changed to positive values. This equation also takes advantage of the relationship $\Delta\beta=\omega\tau_0$. Typical values for silica are g=0.14 and g=1.036×10$^{-17}$ when the angles $\theta$ are expressed in rad/m, $\Delta\tau$ in s/m, and $\omega$ in rad/s. For very small values of inherent birefringence $\Delta\tau$, the observed twist dependence $\Delta\tau_{twist}$ starts with a very low value and increases monotonically with the twist difference angle ($\theta-\theta_0$) for both positive and negative values of the difference angle. For fibers with such low inherent birefringence that its non-twisted DGD cannot be measured, the zero-twist DGD can be calculated from the slope of the larger values on the sides. In intermediate ranges of inherent birefringence and photo-elastic effect, the peak of FIG. 2 is surrounded by sharply rising tails.

Figure 3:
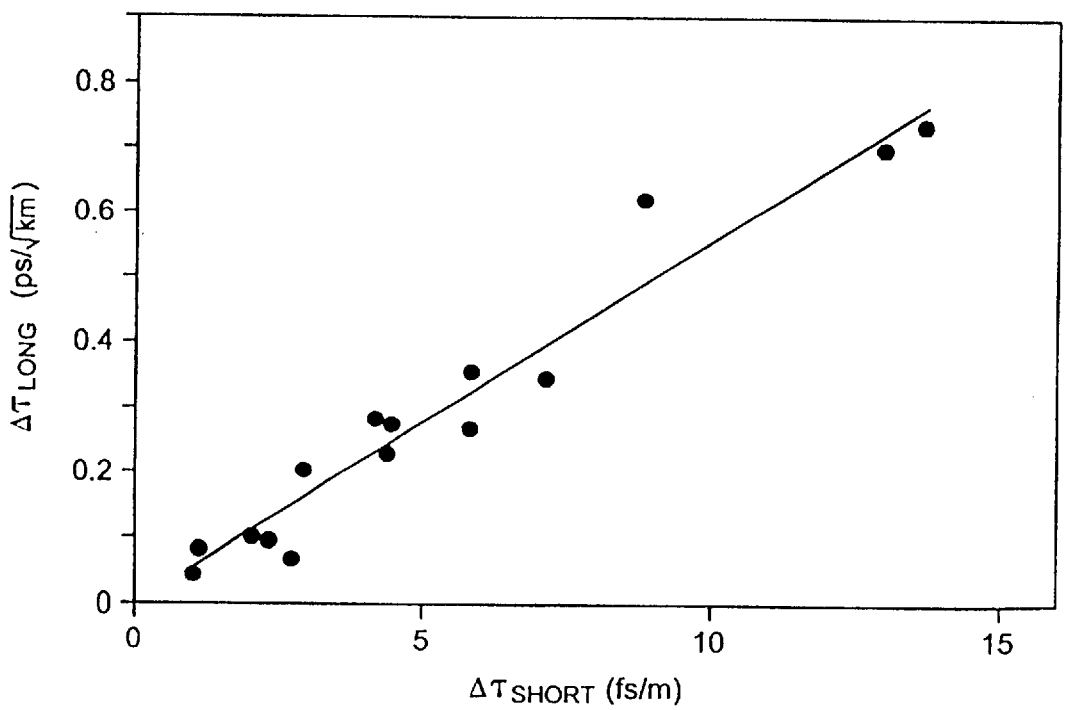
FIG. 3 is graph of the mapping between short-length and long-length values of the polarization mode dispersion.

The polarization mode dispersion measured for a short length of fiber, that is, one significantly shorter than the mode coupling length, needs to be somehow associated with a value for a long fiber for which the unmeasured mode coupling has a significant effect. The association can be performed with an empirically developed map. A 1 km length of fiber is tested for polarization mode dispersion, for example, according to the conventional process described before. The long-length measurement is performed under some set of predetermined conditions of temperature, diameter of the fiber reel, tension of the fiber on the reel, and the type of cable in which the fiber is embedded. A 1 m length of fiber is cut from one end of the 1 km fiber (or possibly both with replication of the procedure) or from the same spool, and that short length is tested for polarization mode dispersion according to the method of the invention described above. Preferably, any spun-on twist introduced during manufacturing is removed by the twist alignment, although the mapping can be performed without zeroing out the twist. The measured short-length polarization mode dispersion coefficient $\Delta\tau_{SHORT}$ is then paired with the measured long-length dispersion coefficient $\Delta\tau_{LONG}$. In practice, the short-length DGD is normalized to the length of the fiber being measured while the long-length DGD is normalized to the square root of the length of the fiber since these are the observed dependencies of the differential time delay in the two regimes. A large number of samples are measured, perhaps 200 to 1000 samples for each map. Each sample is taken from a unique shipping reel of fiber. The normalized long- and short-length differential group delays are expected to be related by $$\Delta\tau_{LONG} = \frac{\sqrt{L_{MLC}}\, L_{LONG}}{L_{SHORT}} \Delta\tau_{SHORT}$$

where $L_{MCL}$ is the average mode-coupling length. As a result, the mapping in large part simply quantifies the average mode coupling length for a particular type of deployment as long as the deployment conditions do not additionally change the short-length DGD. The relationship of the above equation is expected to hold for lengths longer than 1 km. A preliminary mapping for 15 fibers is presented in the data marked by solid circles in FIG. 3. The indicated linear fitting of this data corresponds to an average mode-coupling length $L_{MCL}$ of 2.9 m. This value satisfies the conditions that the short length $L_{SHORT}$ of fiber is less than the mode-coupling length $L_{MCL}$ and the long length $L_{LONG}$ is longer than the mode-coupling length. The mapping demonstrates the validity of the relationship of the above equation.

Subsequent spools of fiber, at least manufactured with the same general manufacturing techniques, are tested only for a short-length value. The empirical mapping is used to predict the fielded behavior dependent upon the long-length value.

Figure 4:
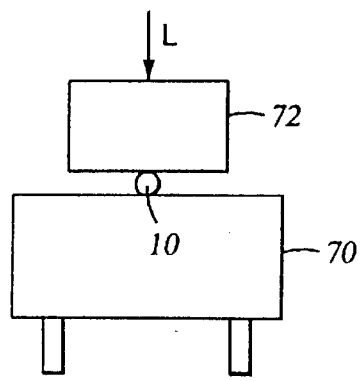
FIG. 4 is an axial cross-sectional view of a load cell.

The apparatus for measuring polarization mode dispersion shown in FIG. 1 can also be used to measure the effects of cabling in a fielded environment. The FUT 10 is placed between a load jig, illustrated schematically in FIG. 4, comprising a table 70 and a load block 72. A variable load L is applied to the load block 72 to impose a lateral load on the fiber 10, and the apparatus of FIG. 1 is used to measure the DGD, that is, $\Delta\tau_0$. The experiment is repeated for a number of different values of the load to demonstrate the effect of loading.

Such a measurement was performed for three fibers exhibiting low, medium, and high DGD with no load. When the load was increased to 2400 g/m, the low-DGD fiber exhibited a very large relative increase, the medium-DGD fiber exhibited only a modest increase, and the high-DGD fiber exhibit a decrease.

The fiber lengths mentioned in the examples are illustrative only. Although a 1 m length for the fiber under test is preferred, the experimental equipment may be extended to 5 m without undue inconvenience. Lengths shorter than 1 m are possible, but introduce difficulty in measuring small values of polarization mode dispersion. Attempts to use 30 cm lengths have proven difficult because of the small measured values. Lengths less than 2 m are conveniently sized, 1 m being preferred. Although conventionally, 1 km lengths of fibers have been measured for polarization mode dispersion, in many circumstances adequate polarization mode mixing can be achieved in lengths of greater than 100 m. These lengths are to be compared with typical spool lengths of 25 km, although spool lengths may range from 4 km to 50 km.

Thus it is seen that the invention provides an effective and simple apparatus and method for measuring birefringent properties, such as differential group delay, in an optical fiber. The invention also provides a method of predicting the birefringent behavior of long lengths of fiber without having to measure the long lengths of fiber.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A method of measuring a birefringent property in an optical fiber comprising the steps of:
    (a) passing incoherent light through a bandpass filter to form probing light;
    (b) setting a state of polarization for the probing light;
    (c) passing the probing light with set state of polarization through a fiber under test;
    (d) detecting a state of polarization for the probing light with set state of polarization after exiting the fiber;
    (e) from repeated sequences of steps (a) through (d) determining the birefringent property of the fiber under test;
    (f) twisting the fiber under test to a twist value, wherein the determining step determines the birefringent property value corresponding to the twist value; and,
    (g) repeating steps (a) through (f) for a plurality of twist values; and
    (h) selecting a birefringent property representative of the fiber under test from the plurality of birefringent property values.

2. A polarization mode dispersion measurement system for measuring a fiber under test comprising:
    at least one incoherent light source emitting light at a first wavelength and at a second wavelength;
    an optical polarizer adjustable to at least three polarization states;
    two bandpass filters passing light respectively at said first and second wavelengths and being insertable in a light path between said at least one light source and said optical polarizer, light output from said polarizer being received by said fiber under test; and
    a polarimeter receiving an optical output of said fiber under test and measuring a polarization state of light received from said fiber under test; wherein the at least one incoherent light source comprises a first and a second light emitting diode emitting respectively at said first and second wavelengths and the first and second bandpass filters receive respective optical outputs of the first and second light emitting diodes,
    and further comprising a first light switch having two first switch inputs receiving respective outputs of said first and second bandpass filter and selectively connectable to a first switch output, the polarizer receiving the first switch output.

3. The system of claim 2, further comprising:

a second optical switch comprising
- a second switch input receiving the light output from the fiber under test, and
- at least two second switch outputs selectively connectable to the second switch input, an output of a first of the switch outputs being received by the polarimeter; and
- an optical detector receiving an output of a second of the second switch outputs.

4. The system of claim 3, further comprising a laser emitting within a bandwidth associated with the first and second light emitting diodes and wherein the first switch includes a third first switch input receiving an output of the laser and being selectively connectable to the first switch output.

5. The system of claim 3, further comprising a visible laser emitting at a visible wavelength and wherein the first switch includes a fourth switch input receiving an output of the visible laser and being selectively connectable to the first switch output.

6. The system of claim 2, further comprising:

an optical switch comprising
- a switch input receiving the light output from the fiber under test, and
- at least two switch output selectively connectable to the switch input, an output of a first of the switch outputs being received by the polarimeter; and
- an optical detector receiving an output of a second of the switch outputs.

7. The system of claim 2, further comprising:

a laser emitting within a bandwidth associated with the first and second wavelengths; and a switch including at least two inputs receiving respective outputs of the laser and the two bandpass filters and being selectively connectable to an output providing light to the fiber under test.

8. The system of claim 2, further comprising:

a visible laser emitting light at a visible wavelength; and a switch including at least two inputs receiving respective outputs of the laser and the two bandpass filters and being selectively connectable to an output providing light to the fiber under test.

9. The system of claim 2, further comprising a twist unit able to induce a selected amount of twist along the fiber under test.

10. The system of claim 2, further comprising a load cell able to induce a selected load upon the fiber under test.

* * * * *